(12) United States Patent
Doemling et al.

(10) Patent No.: US 11,643,092 B2
(45) Date of Patent: May 9, 2023

(54) VEHICLE LANE CHANGE PREDICTION (71) Applicant: Bayerische Motoren Werke Aktiengesellschaft, Munich (DE)

(72) Inventors: Maximilian Doemling, Shanghai (CN); Gavin Xu, Shanghai (CN); Tomas Xu, Shanghai (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 213 days.

(21) Appl. No.: 16/958,318

(22) PCT Filed: Dec. 27, 2017

(86) PCT No.: PCT/CN2017/118905
§ 371 (c)(1),
(2) Date: Jun. 26, 2020

(87) PCT Pub. No.: WO2019/127079
PCT Pub. Date: Jul. 4, 2019

(65) Prior Publication Data
US 2021/0061294 A1   Mar. 4, 2021

(51) Int. Cl.
*B60W 50/00* (2006.01)
*B60W 60/00* (2020.01)
*B60W 30/18* (2012.01)

(52) U.S. Cl.
CPC .. *B60W 50/0097* (2013.01); *B60W 30/18163* (2013.01); *B60W 60/0011* (2020.02);
(Continued)

(58) Field of Classification Search
None
See application file for complete search history.

(56) References Cited

U.S. PATENT DOCUMENTS 9,475,389 B1 * 10/2016 Fung ................... B60K 37/06
9,580,081 B2 * 2/2017 George-Svahn ...... B60W 50/10
(Continued)

FOREIGN PATENT DOCUMENTS

CN    103605285 A    2/2014
CN    105631440 A    6/2016
(Continued)

OTHER PUBLICATIONS

Khosroshahi, A. et al. "Surround Vehicles Trajectory Analysis with Recurrent Neural Networks", 2016 IEEE 19th International Conference on Intelligent Transportation Systems (ITSC), Nov. 1, 2016, pp. 2267-2272, XP033028653 (6 pages).
(Continued)

*Primary Examiner* — Jonathan M Dager
(74) *Attorney, Agent, or Firm* — Crowell & Moring LLP (57) ABSTRACT

A method and a system for lane change prediction. The method includes collecting raw driving data, extracting a plurality of feature sets from the collected raw driving data, and obtaining corresponding lane change information. The lane change information indicates a status of lane change of a vehicle under each of the extracted feature sets. The method further includes automatically labeling each of the extracted plurality sets of features with the obtained corresponding lane change information. The method further includes training a lane change prediction model with the labeled plurality sets of features. Examples of the present disclosure further describe methods, systems, and vehicles for applying the lane change prediction model.

14 Claims, 8 Drawing Sheets

(52) U.S. Cl.
CPC ... *B60W 2520/105* (2013.01); *B60W 2520/14* (2013.01); *B60W 2552/10* (2020.02); *B60W 2554/801* (2020.02)

(56) References Cited

U.S. PATENT DOCUMENTS

| | | | |
|---|---|---|---|
| 9,616,809 B1* | 4/2017 | Alasry | G08G 1/167 |
| 9,841,813 B2* | 12/2017 | Srail | G06F 3/013 |
| 10,011,216 B1* | 7/2018 | Rovik | G06V 40/193 |
| 10,131,353 B2* | 11/2018 | Lee | B60W 30/143 |
| 10,173,586 B1* | 1/2019 | Kashchenko | G06F 3/017 |
| 10,401,960 B2* | 9/2019 | Khalid | G06F 3/011 |
| 10,518,783 B2* | 12/2019 | Tanimichi | G08G 1/16 |
| 10,611,371 B2* | 4/2020 | Kusano | B60W 30/0956 |
| 10,627,813 B2* | 4/2020 | Tsuji | B60W 10/06 |
| 10,656,657 B2* | 5/2020 | Djuric | G05D 1/0276 |
| 10,816,982 B2* | 10/2020 | Lee | G08G 1/096783 |
| 10,839,681 B2* | 11/2020 | Fukumoto | B60W 30/0956 |
| 10,849,543 B2* | 12/2020 | Paudel | A61B 5/7267 |
| 10,882,398 B2* | 1/2021 | Cordell | G06V 20/597 |
| 10,940,863 B2* | 3/2021 | Palanisamy | G06N 3/045 |
| 11,046,320 B2* | 6/2021 | Bertollini | G06F 3/04883 |
| 11,077,854 B2* | 8/2021 | Um | B60W 30/18163 |
| 11,084,490 B2* | 8/2021 | Kim | B60W 30/12 |
| 11,112,796 B2* | 9/2021 | Djuric | G06N 20/00 |
| 11,173,910 B2* | 11/2021 | Kim | B60W 50/14 |
| 11,267,483 B2* | 3/2022 | Adam | B60W 30/18163 |
| 2010/0156617 A1* | 6/2010 | Nakada | A61B 3/113 |
| | | | 340/439 |
| 2011/0169625 A1* | 7/2011 | James | B60W 30/095 |
| | | | 340/439 |
| 2013/0024047 A1* | 1/2013 | Kalhous | G06F 3/013 |
| | | | 701/1 |
| 2014/0148988 A1* | 5/2014 | Lathrop | B60W 30/182 |
| | | | 701/1 |
| 2014/0258942 A1* | 9/2014 | Kutliroff | G06F 3/013 |
| | | | 715/863 |
| 2014/0354539 A1* | 12/2014 | Skogo | G06F 3/013 |
| | | | 345/156 |
| 2014/0361971 A1* | 12/2014 | Sala | G06F 3/013 |
| | | | 345/156 |
| 2015/0234459 A1* | 8/2015 | George-Svahn | B60K 26/02 |
| | | | 345/156 |
| 2016/0046298 A1* | 2/2016 | DeRuyck | G06V 20/597 |
| | | | 340/576 |
| 2016/0320835 A1* | 11/2016 | Kuehne | G06F 3/013 |
| 2017/0031361 A1* | 2/2017 | Olson | B60W 30/0956 |
| 2017/0131719 A1* | 5/2017 | Micks | B60W 40/08 |
| 2017/0267177 A1* | 9/2017 | Nariyambut Murali | B60R 1/00 |
| 2017/0277182 A1* | 9/2017 | May | B60W 50/082 |
| 2017/0282930 A1* | 10/2017 | Kochhar | B60W 50/0097 |
| 2017/0357257 A1* | 12/2017 | Yang | G06N 3/08 |
| 2017/0364147 A1* | 12/2017 | Canella | G06F 16/22 |
| 2018/0105186 A1* | 4/2018 | Motomura | B60W 50/00 |
| 2018/0118219 A1* | 5/2018 | Hiei | B60W 40/09 |
| 2018/0354517 A1* | 12/2018 | Banno | B60W 50/12 |
| 2019/0035275 A1* | 1/2019 | Nishi | G01S 5/0072 |
| 2019/0049987 A1* | 2/2019 | Djuric | G05D 1/0276 |
| 2019/0077398 A1* | 3/2019 | Kusano | B60W 50/0097 |
| 2019/0113929 A1* | 4/2019 | Mukadam | G05D 1/0221 |
| 2019/0118834 A1* | 4/2019 | Wiebel-Herboth | G06F 3/013 |
| 2019/0156134 A1* | 5/2019 | Krishnan | G06V 40/18 |
| 2019/0171211 A1* | 6/2019 | Jang | B60W 40/09 |
| 2019/0265712 A1* | 8/2019 | Satzoda | G05D 1/0246 |
| 2019/0266418 A1* | 8/2019 | Xu | G06T 7/10 |
| 2020/0184238 A1* | 6/2020 | Kobayashi | G06V 40/161 |
| 2020/0189595 A1* | 6/2020 | Bertollini | B60W 30/18163 |
| 2021/0061277 A1* | 3/2021 | Zhang | B60W 10/04 |
| 2022/0089163 A1* | 3/2022 | Qiao | B60W 40/04 |
| 2022/0269279 A1* | 8/2022 | Redford | B60W 50/0098 |

FOREIGN PATENT DOCUMENTS

| | | |
|---|---|---|
| CN | 106828503 A | 6/2017 |
| JP | 2016/170786 A1 | 10/2016 |

OTHER PUBLICATIONS

Supplemental European Search Report issued in European Application No. 17936050.8 dated Jul. 9, 2021 (ten (10) pages).

International Search Report (PCT/ISA/210) issued in PCT Application No. PCT/CN2017/118905 dated Sep. 26, 2018 (two (2) pages).

Written Opinion (PCT/ISA/237) issued in PCT Application No. PCT/CN2017/118905 dated Sep. 26, 2018 (four (4) pages).

* cited by examiner

VEHICLE LANE CHANGE PREDICTION

BACKGROUND AND SUMMARY OF THE INVENTION

The present disclosure relates in general to automated driving vehicles, and in more particular, to vehicle lane change prediction.

An automated driving vehicle (also known as a driverless car, self-driving car, robotic car) is a kind of vehicle that is capable of sensing its environment and navigating without human input. Autonomous cars use a variety of techniques to detect their surroundings, such as radar, laser light, GPS, odometry and computer vision. Advanced control systems interpret sensory information to identify appropriate navigation paths, as well as obstacles and relevant signage.

Based on the levels of driving automation, there are several levels ranging from fully manual to fully automated systems. Some low level automation features, such as Adaptive Cruise Control (ACC), Parking Assistance, Lane Keeping Assistance (LKA), and Blind Spot Monitoring System, have already been widely equipped on cars. However, cars with a higher level automation that when activated by the human driver the car takes full control of all aspects of driving are still under development. Only a very limited number of test cars are permitted to be test run on road in some restricted area. A highly automated driving (HAD) car requires extremely high security, reliability, and robustness. As compared to the above mentioned Drive Assistance features, a HAD system is significantly more complicated since the system itself has to make all of the decisions on driving, including route planning, steering, speed control, and so on. To help the HAD system to make appropriate decisions, companies and technical teams all over the world develop and train a variety of decision models for various situations that may occur on the road.

With the booming of automated driving, the requirement of high accuracy lane change prediction model is raised. For current achievements in field of lane change prediction, some teams use data collected by their own HAD car while other teams use experience models for lane change prediction.

Due to high expense of HAD car, driving data size collected from these cars are quite limited. What's more, collecting driving data on the road by HAD car may also cause legal issues in some countries. For experience model, parameters like distance to left lane border and car's yaw direction are used directly to judge whether lane change is going to happen, which will cause incorrect prediction.

The present disclosure aims to provide a method and a system for lane change prediction, which may solves the problem of limited driving data size and low quality prediction model.

In accordance with a first example embodiment of the present disclosure, a computer-implemented method for lane change prediction is provided, characterized in comprising: collecting raw driving data; extracting a plurality of feature sets from the collected raw driving data; obtaining corresponding lane change information, the lane change information indicating a status of lane change of a vehicle under each of the extracted feature sets; automatically labeling each of the extracted plurality of feature sets with the obtained corresponding lane change information; and training a lane change prediction model with the labeled plurality of feature sets.

In accordance with a second example embodiment of the present disclosure, a computer-implemented method on a vehicle for lane change prediction is provided, characterized in comprising: obtaining a lane change prediction model trained by the method according to the first example embodiment; collecting features of the vehicle corresponding to the feature set used in the lane change prediction model; and applying the lane change prediction model on a vehicle based on the collected features to predict lane change probabilities.

In accordance with a third example embodiment of the present disclosure, a computer-implemented method on a vehicle for making lane change decision based on lane change prediction is provided, characterized in comprising: obtaining a lane change prediction model trained by the method according to the first example embodiment; collecting features of the vehicle corresponding to the feature set used in the lane change prediction model; applying the lane change prediction model on a vehicle based on the collected features to predict lane change probabilities; and making a lane change decision based on the predicted lane change probabilities.

In accordance with a fourth example embodiment of the present disclosure, a system for lane change prediction is provided, characterized in comprising: a data collecting module configured to collect raw driving data; a feature extracting module configured to extract a plurality of feature sets from the collected raw driving data; a lane change information obtaining module configured to obtain corresponding lane change information, the lane change information indicating a status of lane change of a vehicle under each of the extracted feature sets; a labeling module configured to automatically label each of the extracted plurality of feature sets with the obtained corresponding lane change information; and a training module configured to train a lane change prediction model with the labeled plurality of feature sets.

In accordance with a fifth example embodiment of the present disclosure, an apparatus on a vehicle for lane change prediction is provided, characterized in comprising: a model obtaining module configured to obtain a lane change prediction model trained by the method according to the first example embodiment; a feature collecting module configured to collect features of the vehicle corresponding to the feature set used in the lane change prediction model; and a module applying module configured to apply the lane change prediction model on a vehicle based on the collected features.

In accordance with a sixth example embodiment of the present disclosure, a vehicle is provided, characterized in comprising: an apparatus according to the fifth example embodiment; and sensors configured to collect features of the vehicle corresponding to the feature set used in the lane change prediction model.

As compared to prior art lane prediction models, the method and system provided by the disclosed subject matter may achieve at least the following advantages:

With combination of driving data from HAD car and map provider, problem of limit data size for training is solved and lane prediction model can be better obtained;

Training data can be processed more precisely and efficiently by automatic labeling; and Using extracted features for LSTM model training, the prediction result will be more precise and reliable than experience model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

The above and other aspects and advantages of the present disclosure will become apparent from the following detailed description of example embodiments taken in conjunction with the accompanying drawings which illustrate, by way of example, the principles of the present disclosure. Note that the drawings are not necessarily drawn to scale.

DETAILED DESCRIPTION OF THE DRAWINGS

In the following detailed description, numerous specific details are set forth to provide a thorough understanding of the described example embodiments. It will be apparent, however, to one skilled in the art that the described embodiments can be practiced without some or all of these specific details. In other example embodiments, well known structures or process steps have not been described in detail in order to avoid unnecessarily obscuring the concept of the present disclosure.

The term "vehicle" used through the specification refers to a car, an airplane, a helicopter, a ship, or the like. For simplicity, the disclosed subject matter is described with respect to "car", but the embodiments described herein are not limited to "car" only, but are also applicable to other kinds of vehicles. The term "A or B" used through the specification refers to "A and B" and "A or B" rather than meaning that A and B are exclusive, unless otherwise specified.

Figure 1:
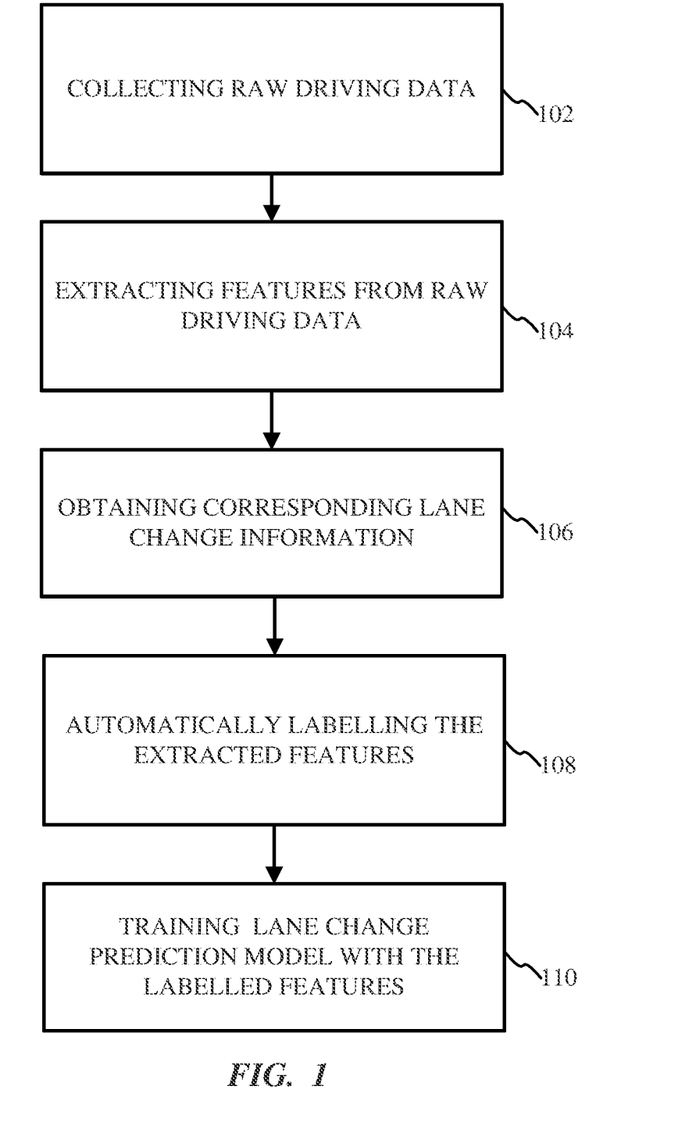
FIG. 1 illustrates a flowchart of an example method for lane change prediction according to an embodiment of the present subject matter.

FIG. 1 illustrates a flowchart of an example method for lane change prediction according to an embodiment of the present subject matter.

The method begins with collecting raw driving data, at block 102. The raw driving data may be provided by a map provider. Also, the raw driving data may be collected by the manufacturer's own HAD car. In a non-limiting example which will be described in more details below, the driving data provided by map supplier is used in general Deep Neural Network model training, while the driving data detected by an automated car is used for model refining. The two different ways of driving data collection can be performed sequentially or simultaneously. In the case that both ways of driving data collection are performed, the driving data detected by our cars and provided by the map provider may be combined for lane change model training data.

At block 104, features may be extracted from the collected raw driving data. As an example, the features comprise a plurality of different features related to a variety of statuses of vehicles. The following table lists some features that can be extracted and used in lane change prediction.

TABLE 1

Extracted Feature List

| FeatureID | Feature Name | Feature Unit | Feature Description |
| --- | --- | --- | --- |
| 1 | VelocityAbs | m/s | Absolute Velocity |
| 2 | LaneDistanceToLeftBorder | m | Vertical Distance between car center line and current lane's left border |
| 3 | LaneDistanceToRightBorder | m | Vertical Distance between car center line and current lane's right border |
| 4 | LaneLeftExists | / | Whether there exists a lane on left side of current lane |
| 5 | LaneRightExists | / | Whether there exists a lane on right side of current lane |
| 6 | AccelerationAbs | m/s$^2$ | Absolute Acceleration |
| 7 | VelocityLateral | m/s | Absolute velocity of the object vertical to lane center line |
| 8 | YalRelToLane | rad | Yaw angle of the object with respect to lane center line |

It should be appreciated that the above features are merely examples and any other suitable features can be extracted from the raw data and used in lane change prediction. The disclosed subject matter is not limited to the specific features and format listed above. The extracted features can form a plurality of feature sets by time, each set indicating the instant values for each feature in the set at a given time. As will be understood by those skilled in the art that the extracted features can be saved in any appropriate format, such as a mat format for TensorFlow training.

At block 106, corresponding lane change information is obtained. The lane change information may indicate a status of lane change of a vehicle under each of the extracted feature sets. In other words, the lane change information may indicate whether the vehicle changes or keeps its lane at the time of features of a feature set are collected.

At block 108, the extracted features are automatically labeled with the obtained corresponding lane change information. To save time and realize high-efficiency labeling, training data may be timely divided into small sections and then labeled automatically based on several restrictions of extracted features. An example of labeled features is shown in FIG. 2.

Figure 2:
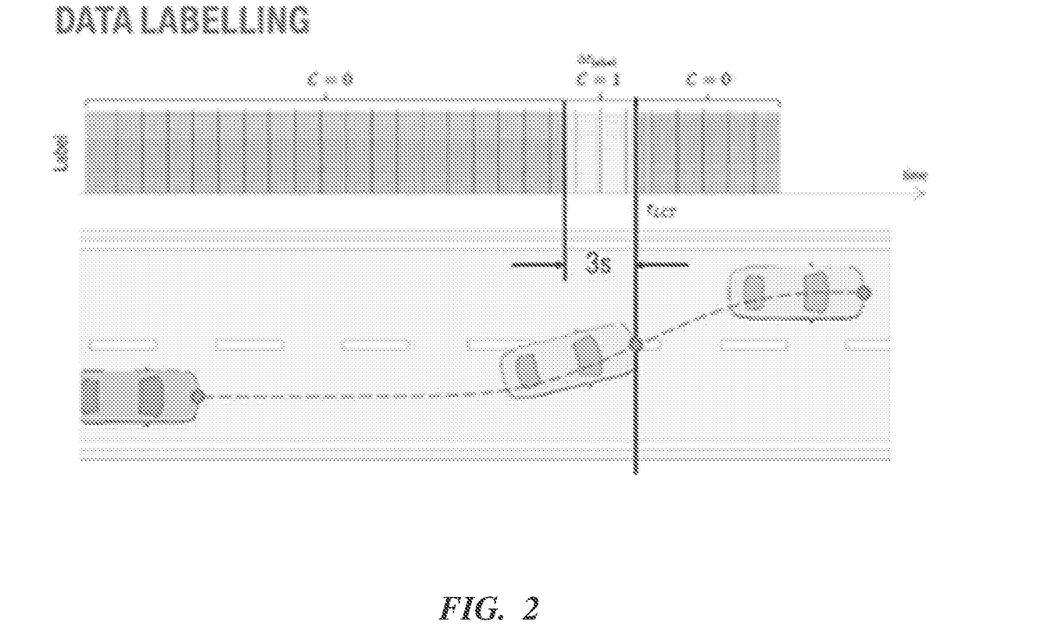
FIG. 2 illustrates an example data labeling according to an embodiment of the present subject matter.

In FIG. 2, the bottom portion shows a car driving alone the right lane of a road. At a certain time, $t_0$, the car begins lane change to the left lane. In three seconds for example, at $t_{LCT}$ (i.e., $t_{LCT}=t_0+3$ s), the lane change to left ends and thereafter, the car continues to driving alone the left lane.

In the upper portion of FIG. 2, it shows the corresponding data labeling progress. For better understanding, the data are shown as aligned with time. Raw data, and in particular the extracted features, corresponding to the same time of collection may be considered as a feature set. Let a parameter C to be a label indicating the lane change, with C=0 representing lane keep and C=1 representing lane change to left. Thus, data corresponding to the time before $t_0$ is labeled with C=0. Then, during the time period from $t_0$ to $t_{LCT}$, in which lane change to left occurs, data is labeled with C=1. From $t_{LCT}$, data is again labeled with C=0. The labeled data can be stored as training data for the lane change prediction model of the disclosed subject matter.

Now turning back to FIG. 1, at block 110, the lane change prediction model is trained with the labeled features. In an embodiment of the disclosed subject matter, the lane change prediction model may be trained on TensorFlow. TensorFlow is an open-source software library developed by Google Brain for machine learning across a range of tasks. It is a symbolic math library, and also used as a system for building and training neural networks to detect and decipher patterns and correlations, analogous to human learning and reasoning.

Figure 3:
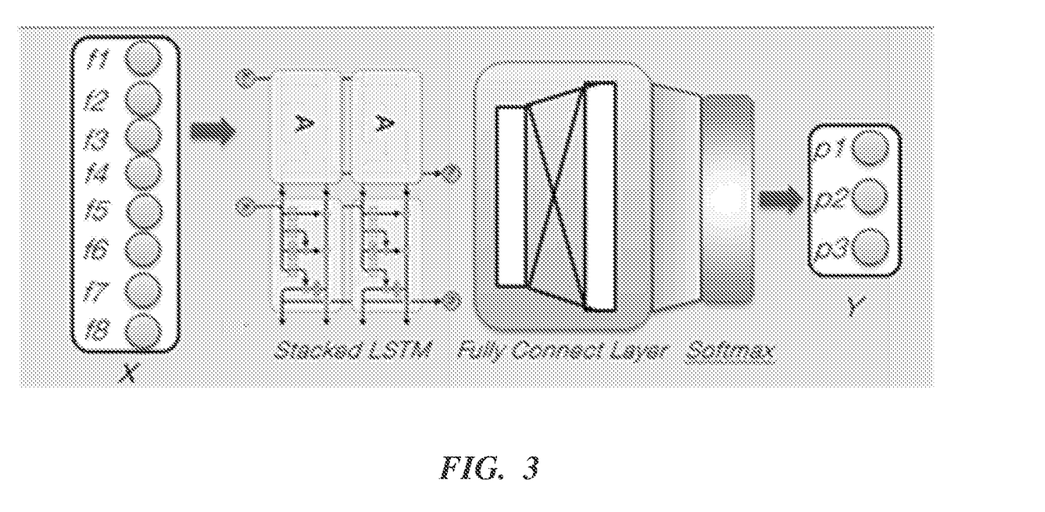
FIG. 3 illustrates an example training model construction that can be used to train a lane change prediction model according to an embodiment of the present subject matter.

FIG. 3 illustrates an example training model construction that can be used to train a lane change prediction model according to an embodiment of the present subject matter. It can be seen from FIG. 3 that firstly input values of eight driving features (f1-f8) with labels of lane change will go through a stacked LSTM (Long Short Term Memory). After that, trained features will be processed by a fully connected layer and Softmax to finally output probabilities respectively of lane change to left, right or lane keeping (p1-p3).

Figure 4:
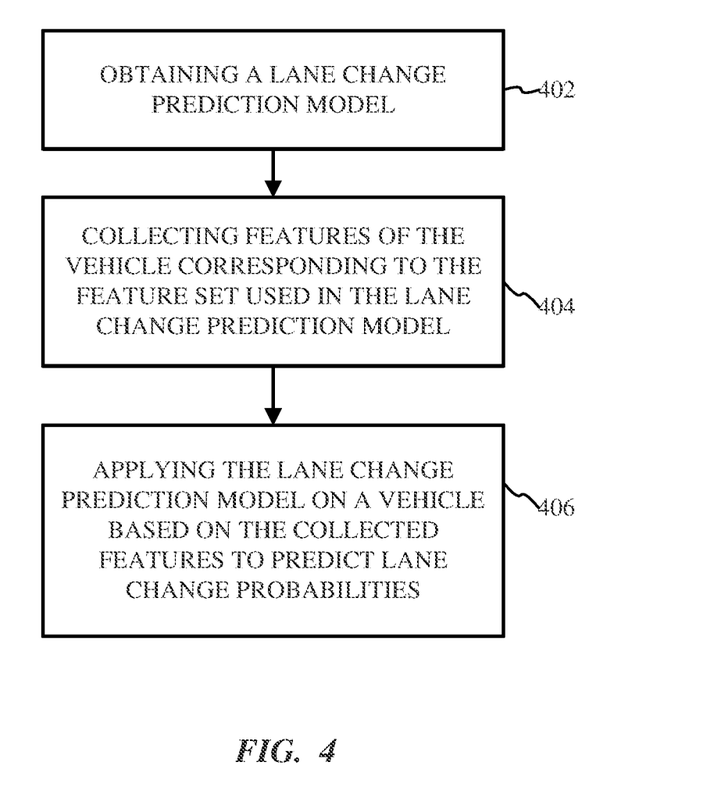
FIG. 4 illustrates a flowchart of an example method for lane change prediction according to an embodiment of the present subject matter.

FIG. 4 illustrates a flowchart of an example method for lane change prediction according to an embodiment of the present subject matter.

The method begins with obtaining a lane change prediction model, at block 402. The lane change prediction model can be the lane change prediction model described with regard to FIG. 1 or any other suitable lane change prediction models. The lane change prediction model can be stored locally on the vehicle, such as in a memory or a storage device on board the vehicle. In such case, the lane change prediction model can be obtained from the on board memory or storage device. Alternatively, the lane change prediction model may be stored remotely, such as on a server or on the cloud that is maintained and served by the manufacturer of the vehicle or some other service providers. In such case, the lane change prediction model can be obtained via a network, such as an Internet connection.

At block 404, features of the vehicle can be collected, such as by sensors of the vehicle. The features to be collected comprises those features corresponding to the feature set, so that such features can be used later in the lane change prediction model as input. Examples of the features to be collected are described above in Table 1.

With the collected features, the method moves to block 406, where the lane change prediction model on a vehicle is applied based on the collected features. As mentioned above, the collected one or more plurality of features sets may be used as input to the lane change prediction model. As a result, the model will provide predicted lane change probabilities corresponding to the input feature set as output. The lane change probabilities comprise probabilities respectively of lane change to left, lane change to right and lane keeping.

Figure 5:
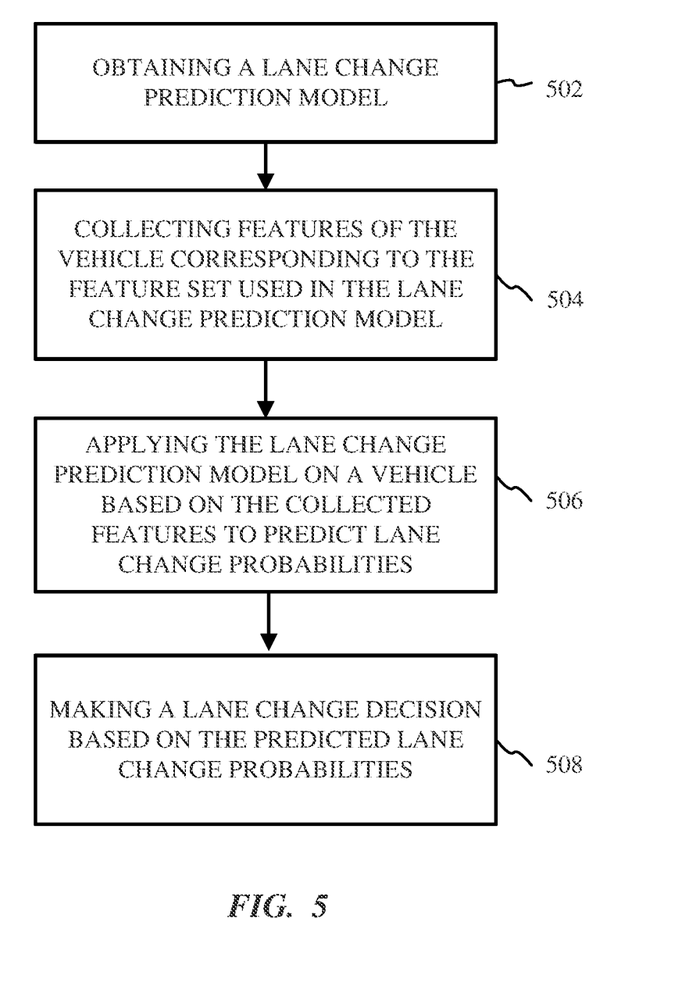
FIG. 5 illustrates a flowchart of an example method for making lane change decision based on lane change prediction according to an embodiment of the present subject matter.

FIG. 5 illustrates a flowchart of an example method for making lane change decision based on lane change prediction according to an embodiment of the present subject matter.

The method comprises obtaining a lane change prediction model (block 502), collecting features of the vehicle corresponding to the feature set used in the lane change prediction model (block 504), and applying the lane change prediction model on a vehicle based on the collected features to predict lane change probabilities (block 506), which are similar to blocks 402, 404 and 406 in FIG. 4. The lane change probabilities outputted by the lane change prediction model can be supplied to a processor or a certain module, such as a decision module, of the vehicle. Then, at block 508, the processor or the decision module may make appropriate decisions regarding a lane change based on the respective probabilities of lane change to left, right or lane keeping. As an example, the predicted lane change probabilities can be used to control the vehicle itself, such as to decide whether the vehicle should change lane or not under the current circumstance, i.e., under the statuses indicated by the current feature set. As another example, the predicted lane change probabilities may be submitted to a server, which in turn may broadcast them to its neighboring vehicles to make them be aware of the potential lane change actions of that vehicle, so those neighboring vehicles may decide how they should respond appropriately.

Figure 6:
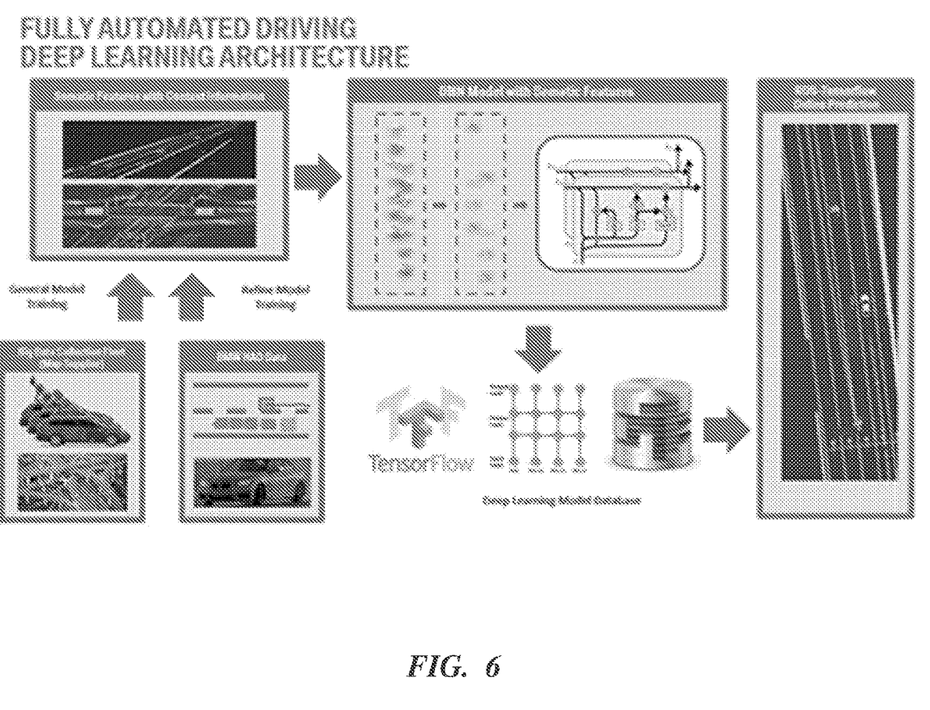
FIG. 6 illustrates a complete architecture of automated driving deep learning system according to an embodiment of the present subject matter.

FIG. 6 illustrates a complete architecture of automated driving deep learning system according to an embodiment of the present subject matter. As aforementioned, the driving data detected by HAD cars and provided by the map provider are combined as raw data for lane change model. Wherein, driving data from map supplier may be used in general DNN (Deep Neural Network) model training, while driving data collected from HAD cars may be applied for model refining. Raw data goes through an automatic data labeling process and becomes sematic features with context information. After that, the labeled data goes through a DNN model and then form a deep learning model database with TensorFlow, for example. Thereafter, ROS and TensorFlow platforms are combined together to finally achieve online lane change prediction.

Figure 7:
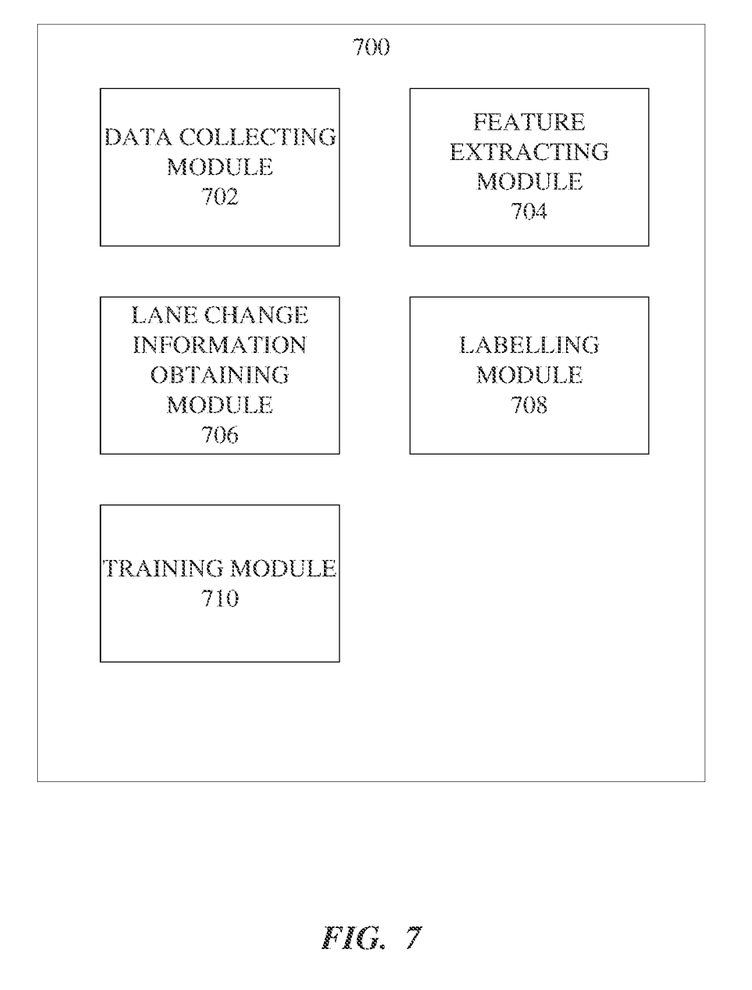
FIG. 7 illustrates an example system 700 for lane change prediction according to an embodiment of the present subject matter.

FIG. 7 illustrates an example system 700 for lane change prediction according to an embodiment of the present subject matter. The system 700 may comprise a data collecting module 702 configured to collect raw driving data, a feature extracting module 704 configured to extract a plurality of feature sets from the collected raw driving data, and a lane change information obtaining module 706 configured to obtain corresponding lane change information. The lane change information may indicate a status of lane change of a vehicle under each of the extracted feature sets. The system 700 further comprises a labeling module 708 configured to automatically label each of the extracted plurality of feature sets with the obtained corresponding lane change information, and a training module 710 configured to train a lane change prediction model with the labeled plurality of feature sets.

Figure 8:
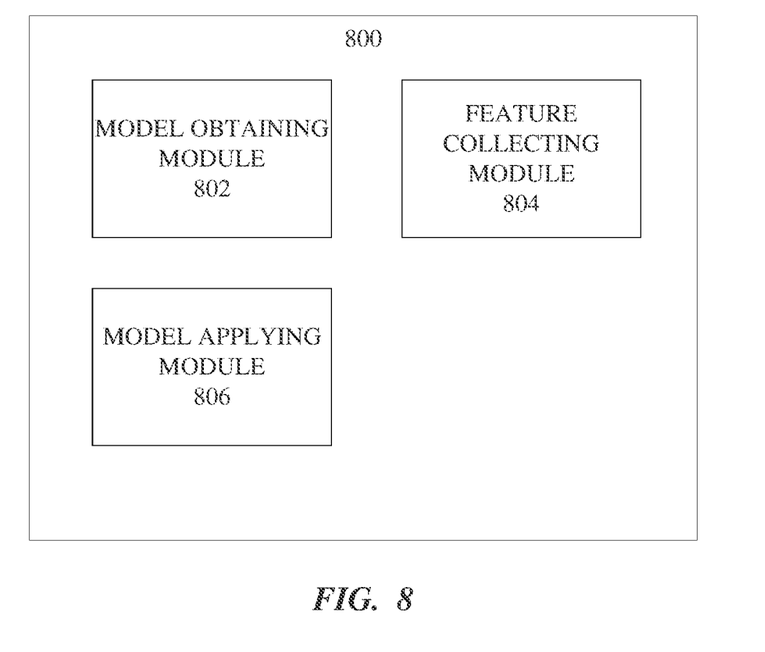
FIG. 8 illustrates an example apparatus 800 for lane change prediction according to an embodiment of the present subject matter.

FIG. 8 illustrates an example apparatus 800 for lane change prediction according to an embodiment of the present subject matter. The apparatus 800 may comprise a model obtaining module 802 configured to obtain a lane change prediction model. The lane change prediction model can be any suitable lane change prediction model such as those described above. The apparatus may further comprises a feature collecting module 804 configured to collect features of the vehicle corresponding to the feature set used in the lane change prediction model, and a model applying module 806 configured to apply the lane change prediction model on a vehicle based on the collected features.

Figure 9:
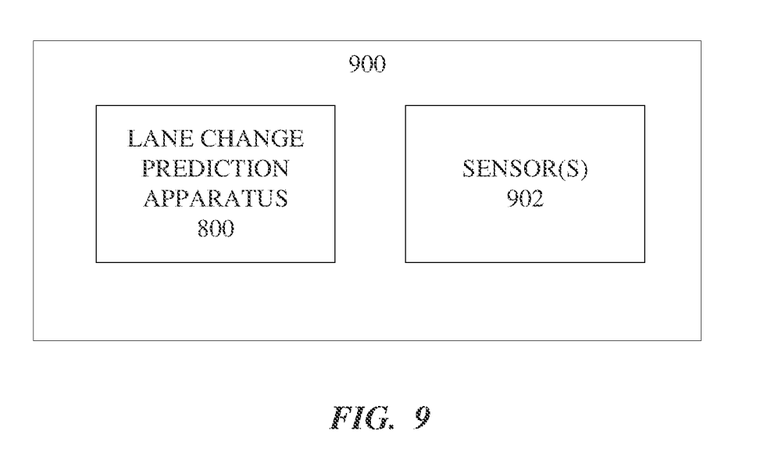
FIG. 9 illustrates an example vehicle 900 according to an embodiment of the present subject matter.

FIG. 9 illustrates an example vehicle 900 according to an embodiment of the present subject matter. The vehicle 900 may comprise an apparatus for lane change prediction, such as the apparatus 800 in FIG. 8. The vehicle 900 may further comprises one or more sensors 902, configured to collect features of the vehicle corresponding to the feature set used in the lane change prediction model. For example, the vehicle 900 may comprises a plurality of sensors each configured to sense one of the following one or more features: absolute velocity; vertical distance between car center line and left border of a current lane; vertical distance between car center line and right border of the current lane; whether there exists a lane on left side of the current lane; whether there exists a lane on right side of the current lane; absolute acceleration; absolute velocity of the object vertical to lane center line; and yaw angle of the object with respect to lane center line.

Figure 10:
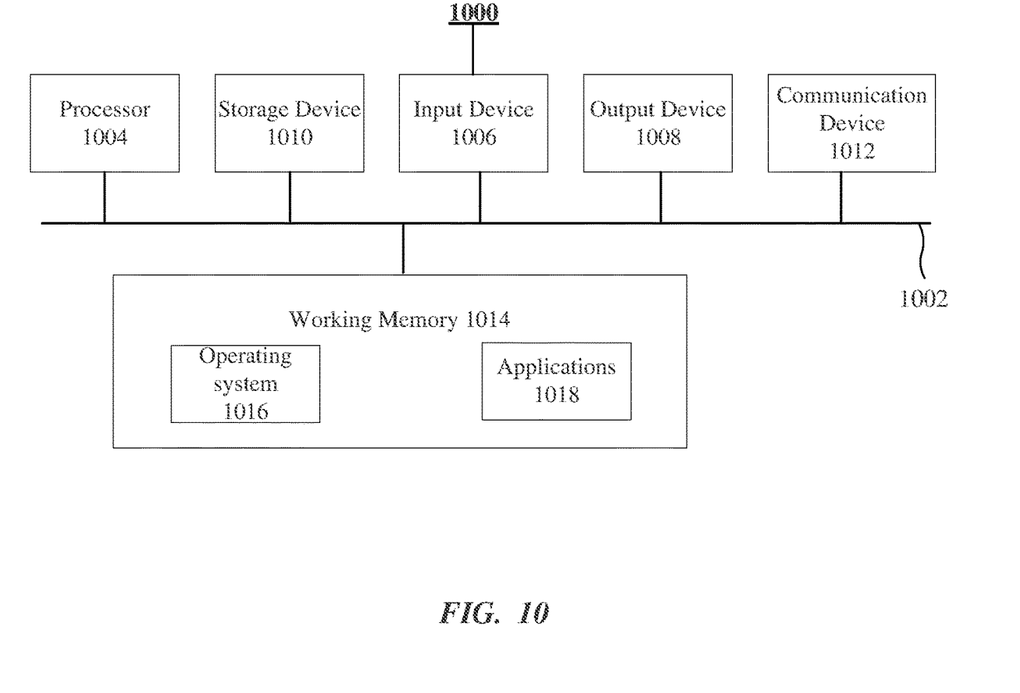
FIG. 10 illustrates a general hardware environment wherein the present disclosure is applicable in accordance with an example embodiment of the present disclosure.

FIG. 10 illustrates a general hardware environment 1000 wherein the present disclosure is applicable in accordance with an example embodiment of the present disclosure.

With reference to FIG. 10, a computing device 1000, which is an example of the hardware device that may be applied to the aspects of the present disclosure, will now be described. The computing device 1000 may be any machine configured to perform processing and/or calculations, may be but is not limited to a work station, a server, a desktop computer, a laptop computer, a tablet computer, a personal data assistant, a smart phone, an on-vehicle computer or any combination thereof. The aforementioned system may be wholly or at least partially implemented by the computing device 1000 or a similar device or system.

The computing device 1000 may comprise elements that are connected with or in communication with a bus 1002, possibly via one or more interfaces. For example, the computing device 1000 may comprise the bus 1002, and one or more processors 1004, one or more input devices 1006 and one or more output devices 1008. The one or more processors 1004 may be any kinds of processors, and may comprise but are not limited to one or more general-purpose processors and/or one or more special-purpose processors (such as special processing chips). The input devices 1006 may be any kinds of devices that can input information to the computing device, and may comprise but are not limited to a mouse, a keyboard, a touch screen, a microphone and/or a remote control. The output devices 1008 may be any kinds of devices that can present information, and may comprise but are not limited to display, a speaker, a video/audio output terminal, a vibrator and/or a printer. The computing device 1000 may also comprise or be connected with non-transitory storage devices 1010 which may be any storage devices that are non-transitory and can implement data stores, and may comprise but are not limited to a disk drive, an optical storage device, a solid-state storage, a floppy disk, a flexible disk, hard disk, a magnetic tape or any other magnetic medium, a compact disc or any other optical medium, a ROM (Read Only Memory), a RAM (Random Access Memory), a cache memory and/or any other memory chip or cartridge, and/or any other medium from which a computer may read data, instructions and/or code. The non-transitory storage devices 1010 may be detachable from an interface. The non-transitory storage devices 1010 may have data/instructions/code for implementing the methods and steps which are described above. The computing device 1000 may also comprise a communication device 1012. The communication device 1012 may be any kinds of device or system that can enable communication with external apparatuses and/or with a network, and may comprise but are not limited to a modem, a network card, an infrared communication device, a wireless communication device and/or a chipset such as a Bluetooth™ device, 802.11 device, WiFi device, WiMax device, cellular communication facilities and/or the like.

When the computing device 1000 is used as an on-vehicle device, it may also be connected to external device, for example, a GPS receiver, sensors for sensing different environmental data such as an acceleration sensor, a wheel speed sensor, a gyroscope and so on. In this way, the computing device 1000 may, for example, receive location data and sensor data indicating the travelling situation of the vehicle. When the computing device 1000 is used as an on-vehicle device, it may also be connected to other facilities (such as an engine system, a wiper, an anti-lock Braking System or the like) for controlling the traveling and operation of the vehicle.

In addition, the non-transitory storage device 1010 may have map information and software elements so that the processor 1004 may perform route guidance processing. In addition, the output device 1006 may comprise a display for displaying the map, the location mark of the vehicle and also images indicating the travelling situation of the vehicle. The output device 1006 may also comprise a speaker or interface with an ear phone for audio guidance.

The bus 1002 may include but is not limited to Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Particularly, for an on-vehicle device, the bus 1002 may also include a Controller Area Network (CAN) bus or other architectures designed for application on an automobile.

The computing device 1000 may also comprise a working memory 1014, which may be any kind of working memory that may store instructions and/or data useful for the working of the processor 1004, and may comprise but is not limited to a random access memory and/or a read-only memory device.

Software elements may be located in the working memory 1014, including but are not limited to an operating system 1016, one or more application programs 1018, drivers and/or other data and codes. Instructions for performing the methods and steps described in the above may be comprised in the one or more application programs 1018, and the units of the aforementioned apparatus 800 may be implemented by the processor 1004 reading and executing the instructions of the one or more application programs 1018. The executable codes or source codes of the instructions of the software elements may be stored in a non-transitory computer-readable storage medium, such as the storage device (s) 1010 described above, and may be read into the working memory 1014 possibly with compilation and/or installation. The executable codes or source codes of the instructions of the software elements may also be downloaded from a remote location.

Those skilled in the art may clearly know from the above embodiments that the present disclosure may be implemented by software with necessary hardware, or by hardware, firmware and the like. Based on such understanding, the embodiments of the present disclosure may be embodied in part in a software form. The computer software may be stored in a readable storage medium such as a floppy disk, a hard disk, an optical disk or a flash memory of the computer. The computer software comprises a series of instructions to make the computer (e.g., a personal computer, a service station or a network terminal) execute the method or a part thereof according to respective embodiment of the present disclosure.

Reference has been made throughout this specification to "one example" or "an example", meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method for lane change prediction comprising:
    collecting raw driving data of an ego vehicle;
    extracting a plurality of feature sets by time from the collected raw driving data, each of the feature sets comprising features;
    obtaining corresponding lane change information, the lane change information indicating a status of a lane change of the ego vehicle at the time the features of a feature set are collected;
    automatically labeling each of the extracted plurality of feature sets with the obtained corresponding lane change information; and
    training a lane change prediction model with the labeled plurality of feature sets, comprising:
        inputting the labeled plurality of feature sets to a stacked long short term memory (LSTM);
        processing the trained plurality of feature sets via a fully connected layer and softmax; and
        outputting lane change probabilities of the ego vehicle comprising lane change to left, lane change to right, and lane keeping.

2. The method according to claim 1, wherein the status of a lane change of the ego vehicle is selected from:
    lane change to left,
    lane change to right, and
    lane keeping.

3. The method according to claim 1, wherein
    the raw driving data further comprises at least one of driving data provided by map suppliers and driving data detected by an automated car.

4. The method according to claim 3, wherein
    the driving data provided by map suppliers is used in general Deep Neural Network model training while the driving data detected by an automated car is used for model refining.

5. The method according to claim 1, wherein
    the extracted features of the feature set comprise one or more of:
        absolute velocity;
        vertical distance between a car center line and left border of a current lane;
        vertical distance between the car center line and right border of the current lane;
        whether there exists a lane on left side of the current lane;
        whether there exists a lane on right side of the current lane;
        absolute acceleration;
        absolute velocity of an object vertical to a lane center line; or
        yaw angle of the object with respect to the lane center line.

6. A computer-implemented method for an ego vehicle for lane change prediction comprising:
    obtaining a lane change prediction model trained by the method according to claim 1;
    collecting features of the ego vehicle corresponding to the feature set used in the lane change prediction model; and
    applying the lane change prediction model on the ego vehicle based on the collected features to predict the lane change probabilities.

7. The method according to claim 6, wherein
    applying the lane change prediction model to predict the lane change probabilities comprises:
        inputting the collected features to the lane change prediction model; and
        outputting, via the lane change prediction model, the lane change probabilities respectively of lane change to left, lane change to right, and lane keeping.

8. A computer-implemented method for an ego vehicle for making a lane change decision based on lane change prediction comprising:
    obtaining a lane change prediction model trained by the method according to claim 1;
    collecting features of the ego vehicle corresponding to the feature set used in the lane change prediction model;

applying the lane change prediction model on the ego vehicle based on the collected features to predict the lane change probabilities; and making a lane change decision by autonomously driving the ego vehicle based on the lane change probabilities.

9. A system for lane change prediction comprising:

a data collecting module configured to collect raw driving data;

a feature extracting module configured to extract a plurality of feature sets by time from the collected raw driving data;

a lane change information obtaining module configured to obtain corresponding lane change information, the lane change information indicating a status of lane change of an ego a vehicle at the time the features of a feature set are collected;

a labeling module configured to automatically label each of the extracted plurality of feature sets with the obtained corresponding lane change information;

a training module configured to train a lane change prediction model with the labeled plurality of feature sets, wherein the lane change prediction model, when applied to the ego vehicle, is configured to predict lane change probabilities of the ego vehicle comprising lane change to left, lane change to right, and lane keeping; and a decision module configured to autonomously drive the ego vehicle based on the lane change probabilities.

10. An apparatus for an ego vehicle for lane change prediction comprising:

a model obtaining module configured to obtain a lane change prediction model trained by the method according to claim 1;

a feature collecting module configured to collect features of the ego vehicle corresponding to the feature set used in the lane change prediction model; and a model applying module configured to apply the lane change prediction model on the ego vehicle based on the collected features.

11. A vehicle comprising:

an apparatus according to claim 10; and a plurality of sensors configured to collect features of the vehicle corresponding to the feature set used in the lane change prediction model.

12. The vehicle according to claim 11, wherein the sensors are each configured to sense one or more of the following features:

absolute velocity;

vertical distance between a car center line and left border of a current lane;

vertical distance between the car center line and right border of the current lane;

whether there exists a lane on left side of the current lane;

whether there exists a lane on right side of the current lane;

absolute acceleration;

absolute velocity of an object vertical to a lane center line; or yaw angle of the object with respect to the lane center line.

13. The vehicle according to claim 11, wherein applying the lane change prediction model comprises:

inputting the collected features to the lane change prediction model; and outputting, via the lane change prediction model, lane change probabilities of the ego vehicle comprising lane change to left, lane change to right, and lane keeping.

14. The vehicle according to claim 11, wherein the vehicle further comprises:

a decision making module configured to make a lane change decision by autonomously driving the ego vehicle based on the lane change probabilities.

* * * * *